(12) United States Patent
Ayan

(10) Patent No.: US 6,769,002 B2
(45) Date of Patent: Jul. 27, 2004

(54) SYSTEM AND METHODS FOR MULTILEVEL ELECTRONIC MAIL COMMUNICATION PROGRAMS

(76) Inventor: Jordan E. Ayan, 416 Apple River Dr., Naperville, IL (US) 60565

(*) Notice: Subject to any disclaimer, the term of this patent is extended or adjusted under 35 U.S.C. 154(b) by 309 days.

(21) Appl. No.: 10/010,464

(22) Filed: Nov. 8, 2001

(65) Prior Publication Data

US 2003/0088824 A1 May 8, 2003

(51) Int. Cl.[7] ............................................. G06F 17/30
(52) U.S. Cl. ..................... 707/104.1; 705/9; 709/203; 709/206; 700/90; 455/466; 455/66.1
(58) Field of Search ..................... 705/9, 14; 709/203, 709/206; 700/90; 455/466, 66.1; 707/104.1

(56) References Cited

U.S. PATENT DOCUMENTS

| 5,315,504 | A | * | 5/1994 | Lemble ........................ 700/90 |
| 5,732,216 | A | * | 3/1998 | Logan et al. ................ 709/203 |
| 5,790,637 | A | * | 8/1998 | Johnson et al. .......... 379/88.04 |
| 5,813,007 | A | | 9/1998 | Nielsen |
| 5,826,022 | A | | 10/1998 | Nielsen |
| 5,864,684 | A | | 1/1999 | Nielsen |
| 5,990,886 | A | | 11/1999 | Serdy et al. |
| 6,055,510 | A | | 4/2000 | Henrick et al. |
| 6,189,026 | B1 | | 2/2001 | Birrell et al. |
| 6,199,106 | B1 | | 3/2001 | Shaw et al. |
| 6,226,670 | B1 | | 5/2001 | Ueno et al. |
| 6,230,156 | B1 | | 5/2001 | Hussey |
| 6,253,202 | B1 | | 6/2001 | Gilmour |
| 6,298,218 | B1 | * | 10/2001 | Lowe et al. ................ 455/66.1 |
| 6,393,464 | B1 | | 5/2002 | Dieterman |
| 6,446,115 | B2 | | 9/2002 | Powers |
| 6,453,347 | B1 | | 9/2002 | Revashetti et al. |
| 6,480,885 | B1 | | 11/2002 | Olivier |
| 6,594,693 | B1 | * | 7/2003 | Borwankar .................. 709/219 |
| 6,625,460 | B1 | * | 9/2003 | Patil ............................ 455/466 |
| 2002/0082919 | A1 | * | 6/2002 | Landau et al. ................. 705/14 |
| 2002/0087646 | A1 | * | 7/2002 | Hickey et al. .............. 709/206 |
| 2002/0143600 | A1 | * | 10/2002 | Dugan ............................ 705/9 |
| 2003/0037102 | A1 | * | 2/2003 | Eckert et al. ................ 709/203 |

OTHER PUBLICATIONS

Excerpts from "iMakeNews", http://www.imakenews.com/page.asp?p=features, pp. 1–5, Nov. 8, 2001.
Excerpts from "Roving", http://www.roving.com/products/, 14 pages, Nov. 8, 2001.
PCT International Search Report as issued in International Application No. PCT/US02/36042, Mailing date Jan. 13, 2003.

* cited by examiner

Primary Examiner—Charles Rones
(74) Attorney, Agent, or Firm—Foley & Lardner LLP

(57) ABSTRACT

An electronic mail communication system enables a user to create an email message from system supplied content and user supplied content. The system may be configured in accordance with an electronic mail communication program participant hierarchy. Each system user within the communication program is affiliated with a participant, and each participant has access to a respective set of system tools used in the creation of an email message that incorporates system content and user content. Each system user further has a respective level of authority in accordance with the use of system tools based on its participant affiliation.

83 Claims, 8 Drawing Sheets

SYSTEM AND METHODS FOR MULTILEVEL ELECTRONIC MAIL COMMUNICATION PROGRAMS

BACKGROUND OF THE INVENTION

1. Field of Invention

Embodiments of the invention relate to electronic mail communication systems and methods, and, in particular embodiments, to electronic mail communication in multilevel communication programs.

2. Background Technology

Electronic mail (email) is rapidly becoming a significant tool for communication within organizations and between organizations and outside parties such as their customers. One application of electronic mail communication is the electronic newsletter, which typically includes promotional material, advertising, event related information and articles on subjects of interest to a target audience such as customers or employees.

Conventionally the development of an electronic newsletter is handled by the company itself, while distribution is performed by the company using its own email server or by an external hosted service. A number of tasks are involved in creating and distributing an electronic newsletter, including writing articles to be included in the newsletter, writing promotional messages or event invitations to be included in the newsletter, entering the aforementioned information into a mailing program, distributing the newsletter electronically at an appropriate time and date, gathering and entering email addresses of recipients, removing email addresses of recipients who do not want to receive mailings in the future, removing invalid email addresses, and resending to email addresses where there is a temporary problem at the time of the initial mailing.

One approach to simplifying the production of electronic newsletters is to utilize a third party solution that enables the company to delegate newsletter production responsibilities to a third party whose economies of scale allow it to perform the same tasks at lower cost. Current examples of such solutions are the iMakeNews service, which is provided through a web site of the same name operated by eLetra Corporation, and the Constant Contact service provided by Roving Software Inc. and described at the website roving.com. These services provide web based electronic newsletter templates that allow a user to manually enter desired content and to format that content in accordance with various predefined layouts. The iMakeNews service also enables the user to select reprints of syndicated preexisting content from commercial databases for inclusion in their newsletter. Both third party services further provide distribution and mailing list management.

Despite these features, presently available electronic newsletter services are not adaptable to the types of marketing program management structures typically employed by multilevel business organizations. The presently available electronic newsletter services are based on a one-to-one paradigm, in which the newsletter reflects the message of a single participant who chooses all of its content. Thus these services do not address the marketing needs of multilevel organizations, in which, for example, it may be desirable for a high level organization such as a manufacturer to coordinate its marketing efforts with lower level organizations such as regional distributors or individual dealers. In addition, the presently available electronic newsletter services are based on a single user model, in which all newsletter creation functions are performed by a single user. Thus these services do not address the needs of larger marketing programs, in which several people may be involved in different phases of the newsletter creation process.

SUMMARY OF THE DISCLOSURE

Various embodiments of the invention relate to systems and methods for providing electronic mail communication services. Various embodiments of the invention provide a variety of features not afforded by the conventional electronic mail communication services such as the conventional newsletter services.

In accordance with one embodiment of the invention, an electronic mail communication system may be configured in accordance with a communication program comprising a hierarchy of participants, with each participant having a relative level of authority within the communication program for using system tools to create email messages. This may be employed, for example, to enable higher level participants to mandate the types of content and specific pieces of content that will be included in email messages sent on behalf of lower level affiliated participants within the hierarchy. In another example, this may be employed to enable a participant at a given level to generate system reports reflecting system information directly related to that participant's level, or to generate reports reflecting an aggregate of system information related to that participant's level and to participants at lower affiliated levels.

In accordance with a further embodiment of the invention, an electronic mail communication system may include an email list manager that enables the creation of multiple email lists that may be affiliated with participants within the communication program. This may be employed, for example, to enable a low level participant to use only its affiliated lists, and to enable a higher level participant to use lists comprising the lists of affiliated lower level participants, or to use its own list.

In accordance with a further embodiment of the invention, an electronic mail communication system may include tools requiring varying user access levels for their use. This may be employed to enable the creation of different types of system users wherein some users have access to all tools including critical administrator level tools, while other users have limited access to a subset of noncritical general level tools, or to low level data entry tools. For example, administrator level users may be granted exclusive use of tools such as an email approval tool to restrict authority for email approval to a select group of users.

In accordance with a further embodiment of the invention, an electronic mail communication system may include system supplied content that a user is enabled to select for inclusion in an email message. The system content is organized by subject so that the user can easily locate content that will be of interest to a particular interest group to whom the email message will be distributed. This frees the user from needing to generate all newsletter content itself.

In accordance with a further embodiment of the invention, an electronic mail communication system may include system supplied third party advertisements that a user is enabled to select for inclusion in an email message such as an email newsletter.

In accordance with a further embodiment of the invention, an electronic mail communication system may include tools for defining various types of user supplied content. These tools may be used, for example, to define a user content type such as a promotion, which in turn enables users to supply specific promotions that may then be included in email messages created using the system.

In accordance with a further embodiment, a system may include a system content database storing system content items of predefined types such as those discussed above, and a user content database storing user content items of predefined types such as those discussed above. The system may further include a plurality of system tools for creating an email message from system content and user content.

In accordance with a further embodiment, a system may include a system content manager such as described above that is accessible to third party system content suppliers. Thus third party content suppliers are enabled to supply original content such as articles or advertisements that may then be used by the communication program participants in their messages. The system may further include a user content manager such as described above, an email manager such as described above, and an email list manager such as described above.

In accordance with another embodiment, a system may comprise at least one processor and computer readable storage media coupled to the at least one processor. The computer readable storage media may store programming instructions that cause the system to provide tools for creating electronic mail messages, to create an electronic mail message in accordance with input provided by system users, and to distribute the electronic mail message on behalf of a participant. The system may be configured so that respective sets of said tools are accessible to respective participants. Therefore, a message may be created based on input received from system users affiliated with different participants within the communication program. Each system user may have access to a set of the tools based on the user's participant affiliation.

In accordance with a further embodiment, an electronic mail communication system may be implemented by providing a plurality of tools for creating an electronic mail message. A hierarchy of participants within a communication program to be serviced by the system may then be defined. The system is thereafter configured to make respective sets of the tools accessible to the users affiliated with each participant. Relationships among related tools are also defined. The relationships allow the use of a given tool on behalf of a given participant to control the uses of tools related to that tool by lower affiliated participants. This implements hierarchical authority among the communication program participants in the creation of messages.

The following description of preferred embodiments discloses a variety of additional features that may be implemented in conjunction with the various embodiments summarized above and in further combinations that will be apparent to those having ordinary skill in the art.

BRIEF DESCRIPTION OF THE DRAWINGS

Embodiments of the invention may be understood from the following description with reference to the following figures, in which.

DETAILED DESCRIPTION OF PREFERRED EMBODIMENTS

Figure 1:
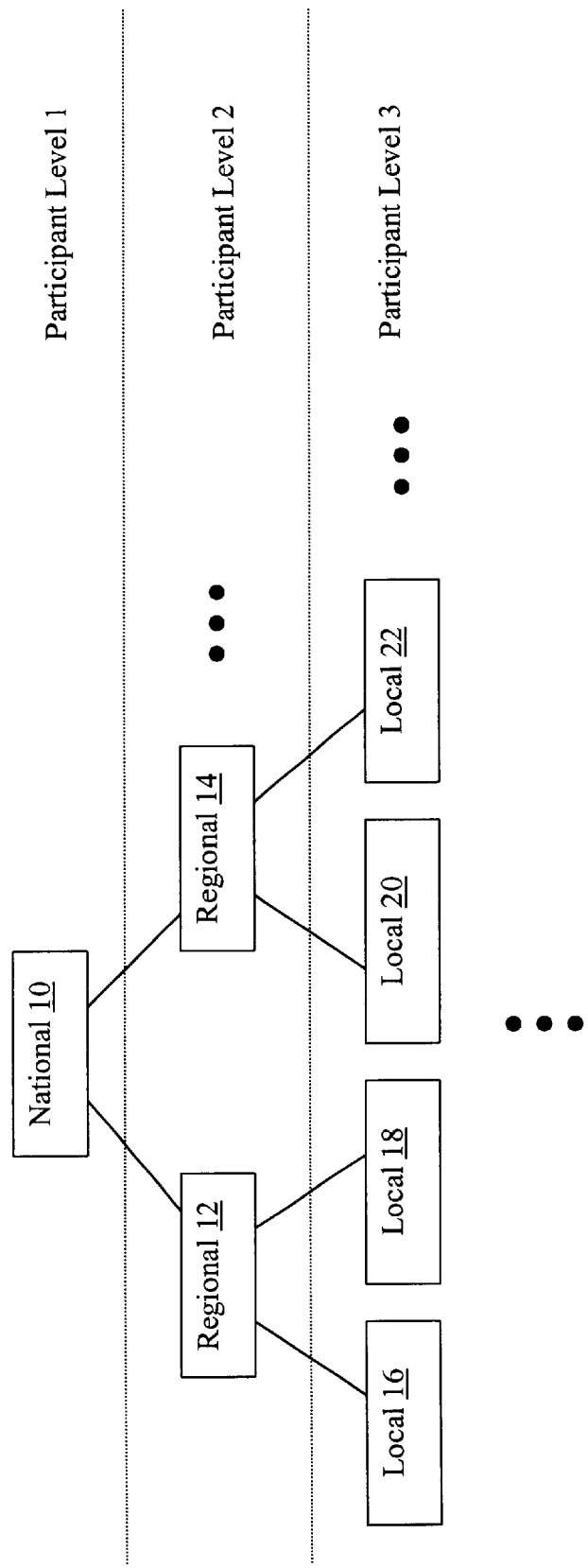
FIG. 1 illustrates an example of a communication program hierarchy in accordance with one embodiment of the invention.

In the following description, details of preferred embodiments of the present invention are set forth. However, it will be apparent to those of ordinary skill in the art that alternative embodiments of the invention may be implemented using only some of the features of the preferred embodiment. While various operations may be described herein in a particular order and as discrete tasks, the order of description should not be construed to imply that the tasks involved in those operations must be performed in the order in which they are presented or that those tasks must be performed discretely. Further, in some instances, well known features are omitted or simplified in order not to obscure the description. In this description, the use of phrases such as "an embodiment," "embodiments," "preferred embodiments" and so forth do not necessarily refer to the same embodiment or all embodiments, although they may.

System Overview

Embodiments in accordance with the invention may comprise an electronic mail communication system that provides tools for creating electronic mail messages, such as newsletters, and provides related tools for performing related tasks such as content creation and email address list management. In accordance with these embodiments, the system may be configured or configurable so as to service multiple participants within an integrated communication program hierarchy. Such a configuration defines subsets of tools that are available to each participant. A participant may be given exclusive use of certain tools. Further, relationships may be defined among the tools of each participant's set of tools. Through these relationships, the use of a tool on behalf of one participant may control uses of that tool and other related tools by lower level affiliated participants. For example, a system tool may explicitly enable a user to choose whether that user's use of that tool controls the manners in which affiliated lower level participants may use that same tool or related tools. Alternatively, where a tool does not enable such specification, the use of that tool by a given user automatically controls the manners in which affiliated lower level participants may use that same tool or related tools.

In accordance with further embodiments of the invention, the system may be configured or configurable so as to assign authority levels to each tool, such that a given system user must possess a given level of authority in order to use a given tool.

Thus, in accordance with these embodiments, a system may be configured or configurable to define a hierarchy of participants each having access to a particular subset of system tools, and to define individual system users, each of whom is affiliated with one of the participants, and each of whom is enabled to use some or all of that participant's tools in accordance with the authority level granted to that user. This allows the various participants in the communication program to control the content of the message in accordance with the hierarchy of authority among the participants. Authority within the hierarchy over email message creation may be implemented through exclusive rights to tools and through relationships defined among the tools of each participant's set of tools that control uses of tools by lower level affiliated participants.

Figure 2:
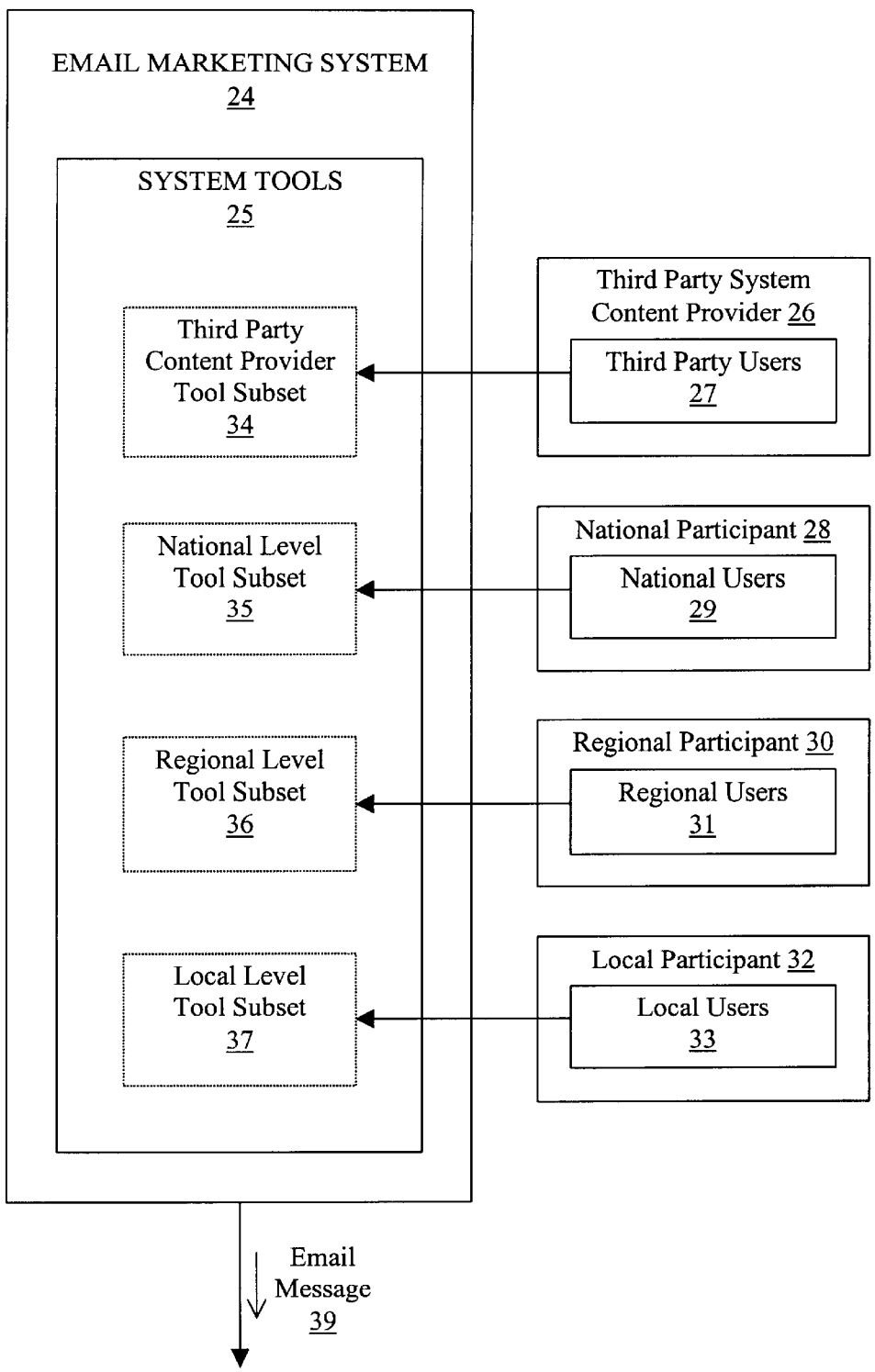
FIG. 2 illustrates a basic system configuration for servicing a third party content provider and multiple participants of a communication program hierarchy in accordance with one preferred embodiment of the invention.

Aspects of the aforementioned configurations are illustrated in FIGS. 1 and 2. FIG. 1 illustrates an example of a communication program having a hierarchical structure in accordance with one embodiment of the invention. In the example of FIG. 1, the communication program is a marketing program that produces email newsletters for distribution to customers and other interested parties. The marketing program comprises a national level participant 10 (participant level 1), regional level participants 12, 14 (participant level 2), and local level participants 16, 18, 20 and 22 (participant level 3). Such a marketing program may involve, for example, an automobile manufacturer at the national level, dealership owners at the regional level, and the dealer's individual showroom locations at the local level. In this example, the marketing program is structured so that local level participants and regional level participants individually send newsletters. The national level participant creates content that it is explicitly enabled to specify as being either mandatory or optional for use in local and regional newsletters. The regional participants likewise create content that they are explicitly enabled to specify as being either mandatory or optional for use in newsletters of affiliated local participants. The marketing program is further structured such that one or more third parties (not shown) provide additional content that is available for use by the local and regional participants at their option.

FIG. 2 illustrates a basic system configuration for servicing the communication program of FIG. 1. As shown in FIG. 2, the email communication system 24 is comprised of system tools 25. The system is configured such that a subset 34 of the system tools 25 is made available to one or more third party content providers 26 to enable creation of content by those providers. The system is further configured such that further respective subsets of tools 35, 36, 37 are made available to the national 28, regional 30, and local 32 participants so as to provide the desired types of participation by each of those types of participants in creation of email messages. In accordance with the marketing program of FIG. 1, the national tool subset 35 comprises content development tools that enable national level users 29 to develop content for use in email messages. The regional tool subset 36 comprises tools that enable regional level users 31 to develop content, to manage email lists and to create email messages 39 using their own content, content provided by the national level participant 28, and content provided by the third party content providers 26. The local tool subset 37 comprises tools that enable local level users 33 to develop content, to manage email lists, and to create email messages 39 using their own content, content provided by the regional level participant 30, content provided by the national level participant 28, and content provided by the third party content providers 26. The system configuration limits the local participant's use of its tools such that it cannot override any content selections mandated by the regional participant or national participant, and limits the regional participant's use of its tools such that it cannot override any content uses mandated by the national participant.

While the communication program structure of FIG. 1 and the corresponding system configuration of FIG. 2 represent one embodiment of the invention, alternative embodiments may be configured in a variety of other manners to service other types of hierarchical communication program structures that involve different types of participant contributions and authorities, as will be apparent from the disclosure provided below.

System Architecture

Figure 3:
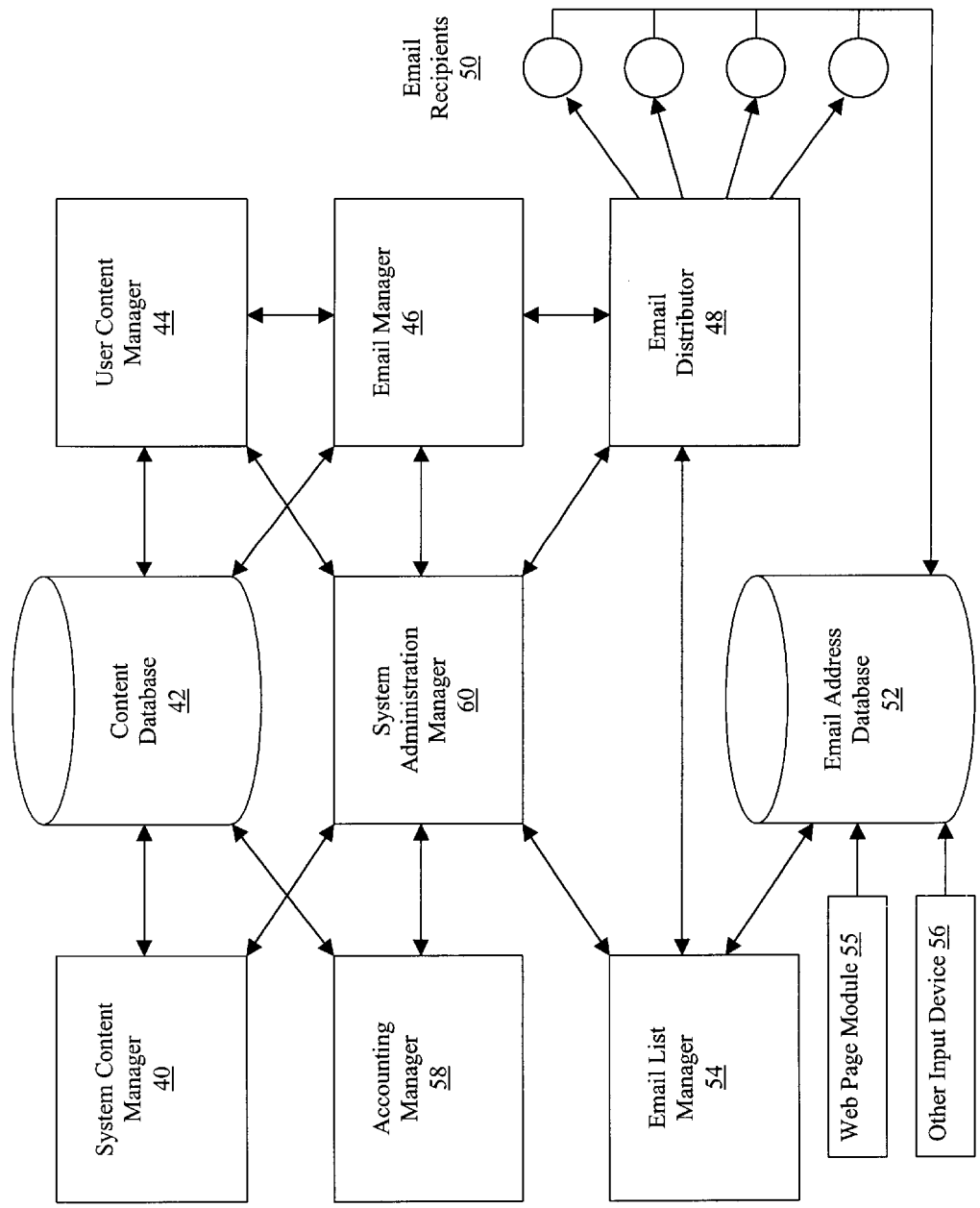
FIG. 3 illustrates basic components in an electronic mail communication system architecture in accordance with one preferred embodiment of the invention.

FIG. 3 provides a high level overview of basic components of a system architecture in accordance with a preferred embodiment of the invention.

The system of FIG. 3 includes a system content manager 40. For purposes of the preferred embodiment, system content is content that is generally not specific to the participants on behalf of whom email messages are sent. For example, in the automobile manufacturer marketing program example provided above, system content would comprise content such as articles concerning auto maintenance, travel, and other subjects of interest to customers of the local dealerships but not specifically concerning the local dealerships. Other types of system content would include advertisements of third parties that may be included in newsletters. Accordingly, system content is typically created by a third party that is not a participant in the marketing program, or by a top level program participant that does not use the system to send email messages on its own behalf. System content is typically subject to approval by the top level participant, and is typically available for use by all participant levels of the communication program once it is approved. The system content manager 40 provides tools that enable system content to be created, edited, approved, and classified. System content may be stored in a content database 42.

The system of FIG. 3 further includes a user content manager 44. For purposes of the preferred embodiment, user content is content that is provided by a participant and is specific to that participant or a lower level affiliated participant. For example, in an automobile manufacturer marketing program as described above, user content would comprise information concerning promotions, events, or other regional or local participant specific information. Typically, system content may be created by any participant and is not subject to approval by other higher level participants. However, the top level participant typically has the exclusive right to define the types of user content that may be provided in newsletters. In accordance with the preferred embodiment, a participant may explicitly specify that a specific user content item that it has created is optional, mandatory, or not available for lower level affiliated participants. The user content manager 44 provides tools that enable a user to define user content types and to create and edit user content. The user content is stored in the content database 42.

The system of FIG. 3 further includes an email manager 46. The email manager 46 provides tools that enable a user to create and edit email messages that incorporate system content stored in the content database 42 and user content that is stored in the content database 42 or that is supplied at the time of newsletter creation by the user.

The email manager 46 interfaces with an email distributor 48 that prepares and sends individual messages to email recipients 50 using email addresses stored in address lists of an email address database 52. In practice the email address database 52 and the content database 42 may be implemented using a single database system.

Addresses in the email address database 52 may be entered and organized using tools provided by an email list manager 54. Addresses may also be entered into the email address database 52 from web page modules 55 that are placed on program participants' web pages to allow interested parties to subscribe to receive email messages, such as electronic newsletters, on an opt-in basis. Other input devices 56 such as personal digital assistants, point of sale terminals, or other hardware or software implemented mechanisms may be enabled to provide email addresses to the email address database 52.

The system further includes an accounting manager 58 that tracks accounting information for participants and their affiliated users.

The system content manager 40, user content manager 44, email manager 46, email distributor 48, email list manager 54 and accounting manager 58 are interfaced to a system administration manager 60. The system administration manager 60 performs a variety of system administration and configuration functions. One primary function of the system administration manager 60 of the preferred embodiment is configuration of the system to define a marketing program and its participants in accordance with the structure of a marketing program to be serviced. In the preferred embodiment of FIG. 3, the tool sets available to each type of participant are not configurable, and so creation of a given participant grants access to the corresponding tool set by default. However, in other embodiments, participant creation may entail specifying individual tools or sets of tools that are accessible by that participant.

Another primary function of the system administration manager 60 is creation of system users that are associated with particular communication program participants and that have various levels of authority for accessing their affiliated participant's subsets of system tools. In the preferred embodiment of FIG. 3, the tools provided by the email list manger 54, user content manager 44, and email manager 46 are organized by common access levels designated as "system administrator" level (reserved for users who are not affiliated with a particular marketing program participant), "administrator" level, "general" level and "data entry" level. Accordingly, by granting one of these levels of access to a user, the user is enabled to use all of the tools of those three components that are available to that user based on the user's participant affiliation and that require the user's level of access or a lower level of access. Similarly, the tools provided by the system content manager 40 are organized by common access levels designated as "publisher" level, "editor" level, and "author" level. Accordingly, by granting one of these levels of access to a user, the user is enabled to use all of the tools of the system content manager 40 that are available to that user based on the user's participant affiliation and that require the user's level of access or a lower level of access. In the preferred embodiment of FIG. 3, a user may be granted one of the aforementioned levels of access, and is thereby granted access to all tools available with that level of access and available to the user's affiliated participant. Thus, a user may not have access to system content management tools and other system tools, since the system content manager uses different access definitions than the other tools. However, in alternative embodiments, the user may be assigned levels of access on a component by component basis. For example, a user could be granted author level access to system content management tools, administrator level access to email manager tools, and general level access to email list manager and user content manager tools. In further alternative embodiments, different levels of access may be defined for the tools, or access to tools may be granted to a given user on a tool by tool basis.

While the system tools of the preferred embodiment are organized into an architecture comprising groups of related tools as represented in FIG. 3 in order to facilitate understanding of the preferred embodiment, those having ordinary skill in the art will appreciate that actual implementations of systems such as the system of FIG. 3 may be organized in other manners.

System Content Manager

Figure 4:
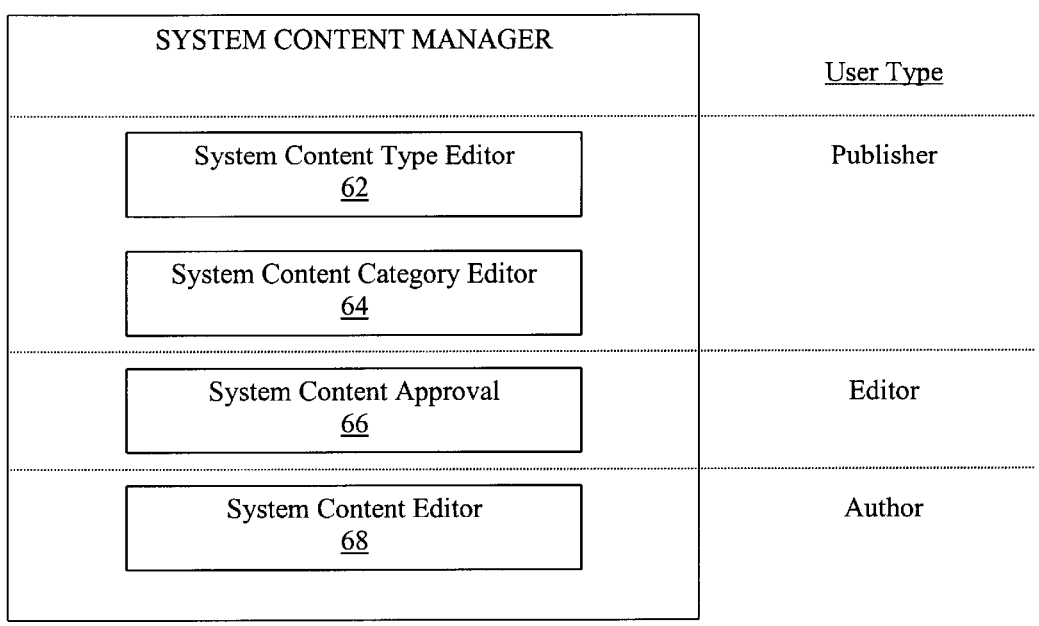
FIG. 4 illustrates tools provided by a system content manager of the system of FIG. 3.

FIG. 4 illustrates tools provided by the system content manager 40 of the preferred embodiment illustrated in FIG. 3. The system content manager tools include a system content type editor tool 62, a system content category editor tool 64, a system content approval tool 66, and a system content editor tool 68.

The system content type editor 62 enables a user to define or edit the definitions of types of system content that appear in the system content database for a given communication program. The system content type editor 62 preferably presents a graphical user interface to the user that enables the user to enter a system content type name and description. For example, in an embodiment configured to produce newsletters, the system may include the content types "Article" and "Advertisement." However, in alternative embodiments other content types may be defined in accordance with the needs of the particular communication program.

The system content manager further provides a system content category editor 64 that enables a user to define or edit categories that are used to classify system content within each of the system content types defined for that communication program. The system content category editor 64 preferably presents a graphical user interface that enables the user to enter a category name and description, and to specify additional attributes that may be provided for a system content item associated with the defined category. For example, in the newsletter embodiment described above, a variety of subject matter categories may be defined within the system content type "Articles." These categories are used to organize the articles around subjects that will be of particular interest to interest groups targeted by communication program participants. These categories may include an author attribute that enables a user to associate an author name with a content item. However, in alternative embodiments other content categories and related attributes may be defined in accordance with the needs of the particular communication program.

The system content manager further provides a system content approval tool 66 that enables a user to approve system content that has been stored in the system content database so that it is released for use by communication program participants. The system content approval tool 66 preferably presents a graphical user interface that enables the user to view unapproved system content that is organized by type and category, to view each piece of system content individually, and to approve each piece of system content individually. A similar interface showing approved system content and enabling retraction of a prior approval is also preferably provided.

The system content manager further provides a system content editor 68 that enables a user to enter system content into the system content database. The system content editor 68 preferably presents a graphical user interface that enables the user to select the type and category of the system content from among types and categories that have been defined previously using the system content type editor 62 and system content category editor 64, to provide information for attributes associated with the selected type and category, and to provide a content item. For example, in the preferred embodiment of FIG. 3, the name of a system content item, the text of the system content item, and the author may be specified for content of the type "Article."

The availability of each of the system content manager tools depends on the level of access granted to the user. A publisher level user has access to all tools, allowing the user to define and edit system content types and categories as well as to approve, edit and create system content. An editor level user has access to the system content approval 66 and system content editor 68 tools, allowing the user to create, edit and approve system content of the types and categories defined by the administrator. An author level user has access only to the system content editor tool 68, and may therefore create and edit his particular system content. Accordingly, by possessing one of these levels of access, a user is enabled to use all tools requiring that level of access. In alternative embodiments, different levels of access may be defined for the tools, or access to tools may be granted to a given user on a tool by tool basis.

Email List Manager

Figure 5:
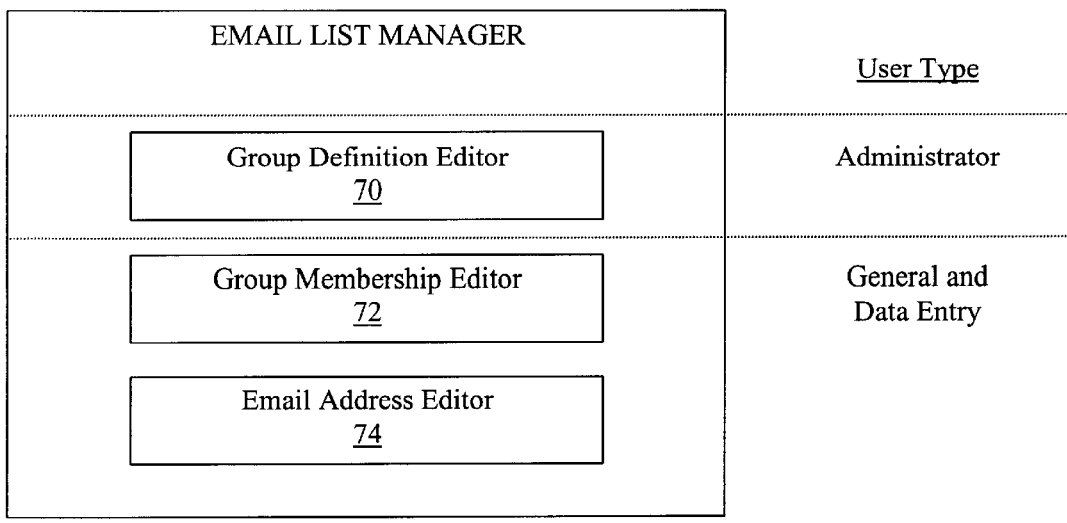
FIG. 5 illustrates tools provided by an email list manager of the system of FIG. 3.

FIG. 5 illustrates tools provided by the email list manager 54 of the preferred embodiment illustrated in FIG. 3. The email list manager tools include a group definition editor tool 70, a group membership editor tool 72, and an email address editor tool 74.

The group definition editor 70 enables a user to define or edit the definitions of groups of email recipients. The group definition editor 70 preferably presents a graphical user interface that enables the user to enter a group name and description, and allows the user to view and edit existing group definitions and to define additional information fields to be collected for each group. In the preferred embodiment of FIG. 3, a group is automatically affiliated with the participant by whom the group is created. In alternative embodiments, the group definition editor may enable the user to specify a participant affiliation of each defined group. Groups are typically organized in accordance with interests common to the group members.

The email list manager further provides a group membership editor 72 that enables a user to associate email addresses with previously defined groups. The group membership editor 72 preferably presents a graphical user interface that enables the user to search for an email address or view a list of email addresses, to indicate the group affiliation of an email address, and to delete an email address from a particular group. Email addresses are preferably enabled to belong to multiple groups.

The email address editor 74 enables a user to enter email addresses into the email address database. The email address editor 74 preferably presents a graphical user interface that enables the user to enter an email address, to select one or more group affiliations from a list of available groups, to specify the format of email to be sent to the address (e.g. text or HTML), and to add additional information such as the name and address and other demographic information for the individual associated with the email address.

The availability of each of the email list manager tools depends on the level of access granted to the user of the email list manager. An administrator level user has access to all email list manager tools, allowing the administrator to define and edit groups and participant affiliations, to edit group membership, and to enter email addresses and related information. General level users and data entry level users are enabled to use the group membership editor 72 and email address editor 74, and therefore can enter addresses and change group memberships, but cannot edit group definitions. However, in alternative embodiments, different levels of access may be defined for the tools, or access to tools may be granted to a given user on a tool by tool basis.

Additional email list management tasks relating to email address validity and subscriber management may be performed by the email list manager 54 through interaction with the email distributor 48. In particular, the email distributor determines invalid addresses, such as addresses that produce hard bounces, or that continue to produce soft bounces after a given number of retries. These addresses are communicated to the email list manager 54, which may flag the email addresses in the email address database 52 or may remove those addresses from the database.

Additional email list management tasks relating to adding new subscribers and removing current subscribers may be performed by web page modules 55 or other input devices 56 as illustrated in FIG. 3. For example, a web page module placed on a communication program participant's web page may enable a web page visitor to become a newsletter subscriber by providing an email address and additional optional information, which is then stored in the email address database 52. Other input devices 56 such as point of sale terminals, personal digital assistants or other hardware or software implemented input mechanisms may enable a similar subscription process. In addition, a web page module may enable a user to unsubscribe from a newsletter. The unsubscribe module may be located on the communication program participant's web site, and newsletters may include a link to the unsubscribe module.

A newsletter recipient may also be enabled to unsubscribe by sending an unsubscribe message which removes the email address of the unsubscribing party from the email address database.

User Content Manager

Figure 6:
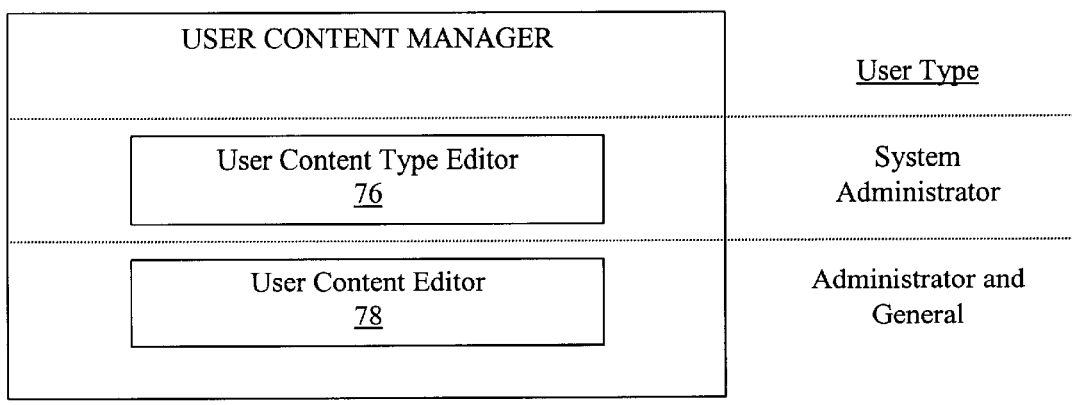
FIG. 6 illustrates tools provided by a user content manager of the system of FIG. 3.

FIG. 6 illustrates tools provided by the user content manager 44 of the preferred embodiment illustrated in FIG. 3. The user content manager tools include a user content type editor 76 and a user content editor 78.

The user content type editor 76 enables a user to define a type of user content that may be included in an email message. The user content type editor 76 preferably presents a graphical user interface that enables the user to provide a name and description for a user content type, to specify additional parameters associated with that type of content, and to specify participant related parameters that may be employed by a system user to specify whether a user content item of that type is optional, mandatory, or not available for use by lower level affiliated participants. For example, in the newsletter example discussed above, the system may include definitions for the user content types "events" (happenings of interest to newsletter recipients) and "promotions." Each of those content types may be defined to include a date parameter that may be specified by a creator of user content of that type. Each of those content types may be further defined to include a participant related parameter that enables a creator of user content of that type to indicate whether that content item is mandatory, optional or not available for lower level affiliated participants. In the preferred embodiment, the user content types comprise text information, but in alternative embodiments, user content types may be defined to include a variety of types of content, such as graphical images, URLs, or other information.

The user content manager further provides a user content editor tool 78. The user content editor 78 preferably presents a graphical user interface that enables the user to enter a user content item including the user content type, a title, and text of the item. The user interface also preferably enables the entry of information for related parameters of the given content type. In the newsletter example, the system includes the user content types "event" and "promotion" and the user interface of the user content editor enables the user to select and enter data for user content items of each of those types. In addition, the user content editor enables the user to specify lower level affiliated participants for whom the user content item is mandatory or optional, and allows the entry of dates associated with each item.

The availability of each of the user content manager tools depends on the level of access granted to the user of the user content manager. In the preferred embodiment of FIG. 3, the user content type editor is reserved for system administrator level users and is therefore not accessible by users within the marketing program. Administrator and general level users are enabled to use the user content editor 78 to enter and edit user content. In alternative embodiments, different levels of access may be defined for the tools, or access to tools may be granted to a given user on a tool by tool basis.

Email Manager

Figure 7:
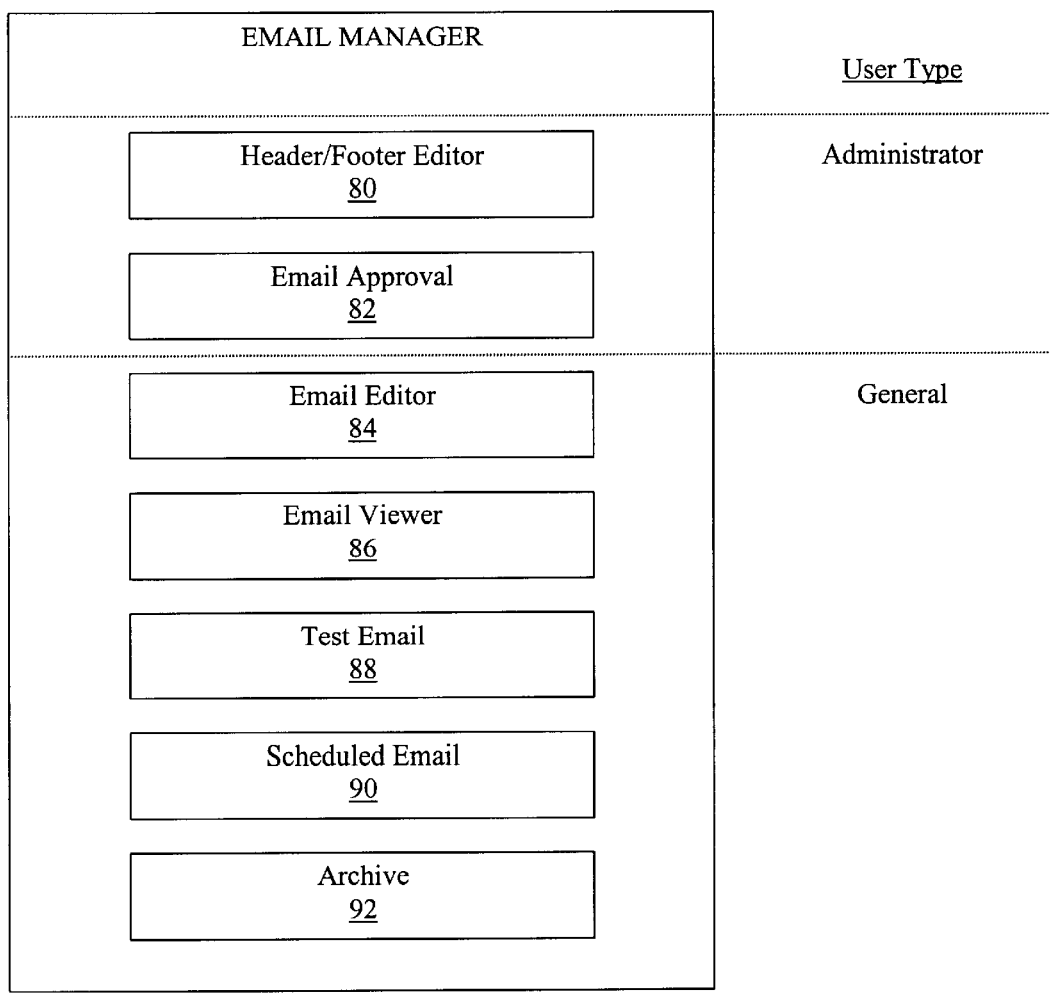
FIG. 7 illustrates tools provided by an email manager of the system of FIG. 3.

FIG. 7 illustrates tools provided by the email manager 46 of the preferred embodiment illustrated in FIG. 3. The email manager tools include a header/footer editor tool 80, an email approval tool 82, an email editor tool 84, an email previewer tool 86, a test email tool 88, a scheduled email viewer tool 90, and an archive viewer 92.

The email manager provides a header/footer editor 80 that enables a user to enter the contents of a header and a footer that will appear in email messages distributed by that user's affiliated participant. The header/footer editor 80 preferably presents a graphical user interface that enables the user to view the contents of the header and footer and to enter and edit the header and footer text.

The email manager further provides an email approval tool 82 that enables a user to view and approve messages that have been configured and scheduled for delivery. The email approval tool 82 preferably presents a graphical user interface that enables the user to view a list of messages awaiting approval along with their scheduled delivery times and the participants on behalf of whom the messages are being sent. The user interface further preferably enables the user to view each scheduled message and to indicate final approval that releases the email for its scheduled distribution.

The email manager further provides an email editor tool 84 that enables a user to create an email message from system content and user supplied content of the types described above. The email editor 84 preferably presents a graphical user interface that presents the user with a series of tools for email message configuration. Tools provided by the email editor in accordance with the preferred embodiment of FIG. 3 are discussed below.

The email manager further provides an email viewer tool 86. The email viewer 86 preferably presents a graphical user interface that enables the user to view complete and partially complete messages.

The email manager further provides a test email tool 88. The test email tool 88 preferably presents a graphical user interface that enables the user to send a test email of a completed message to email addresses of the user's choice.

The email manager further provides a scheduled email tool 90. The scheduled email tool 90 preferably presents a graphical user interface that enables the user to view a list of scheduled messages and to edit scheduled dates and times. The user interface preferably enables the user to invoke the email viewer 86 to view a message in the schedule. The user interface also preferably enables the user to invoke the email editor 84, to edit a message in the schedule, to invoke the test email tool 88 to send a test mailing of a message in the schedule, and to remove a message from the schedule.

The email manager further provides an archive tool 92. The archive tool 92 preferably presents a graphical user interface that enables the user to view a list of past messages. The user interface also preferably enables the user to invoke the email viewer 86 to view a message in the archive.

The availability of each of the email manager tools depends on the level of access granted to the user of the email manager. In the preferred embodiment of FIG. 3, an administrator level user has access to all tools, and therefore is enabled to define and edit user content types, edit headers and footers, approve messages for distribution, and use all lower level tools. A general level user may use the email editor to create and edit messages, preview and send test messages, view email schedules and archives, and enter user content. Data entry level users do not have access to the email manager tools. In alternative embodiments the email approval tool may be designated as a system administrator level tool, thus reserving the right of final approval for transmissions to the system administrator rather than to a user within the marketing program. In further alternative embodiments, different levels of access may be defined for the tools, or access to tools may be granted to a given user on a tool by tool basis.

Email Editor

Figure 8:
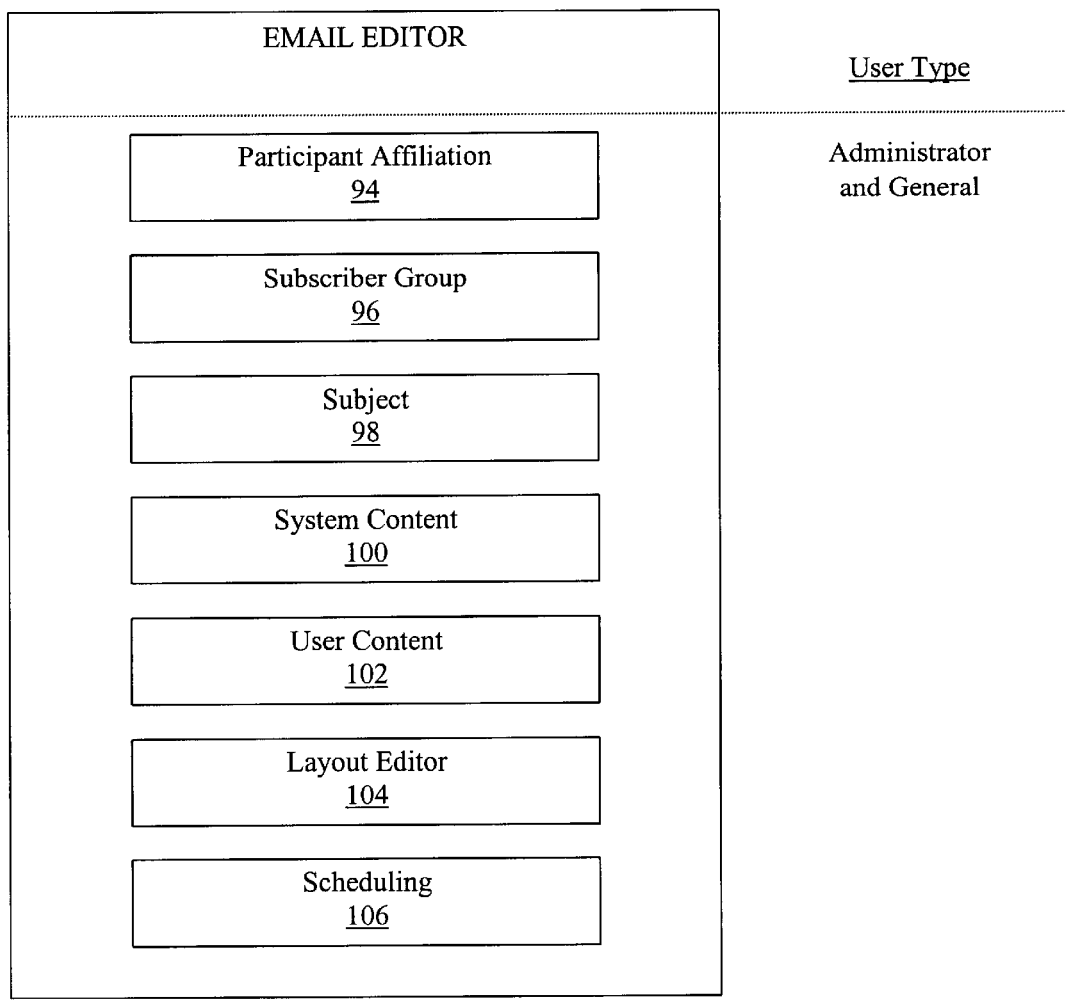
FIG. 8 illustrates tools provided by an email editor of the email manager of FIG. 3.

The email editor tool 84 provided by the email manager illustrated in FIG. 7 provides a group of tools that enable a user to create an email message that includes system content and user content. FIG. 8 illustrates email message creation tools provided by the email editor 84 in accordance with the preferred embodiment illustrated in FIG. 3.

The email editor provides a participant affiliation tool 94 that enables the user to specify a system participant on behalf of whom the message is to be distributed. The participant affiliation tool 94 preferably presents a graphical user interface that allows the user to choose from a list of program participants for whom the user has authority to specify message content.

A subscriber group tool 96 of the email editor enables the user to select a subscriber group to which the message is to be distributed. The subscriber group tool preferably presents a graphical user interface that allows the user to choose from a list of subscriber groups that are affiliated with the user's affiliated participant. The user is preferably enabled to select multiple subscriber groups.

The email editor further provides a subject editor tool 98. The subject editor 98 preferably presents a graphical user interface that enables the user to enter text that will appear in the subject line of the email message.

The email editor further provides a system content tool 100. The system content tool 100 preferably presents a graphical user interface including a list of available system content items that may be selected by the user for inclusion in the message. In the newsletter example, the available system content items include articles and ads, which are provided separately according to content type. Articles are further arranged by category, so that the user can easily determine the various categories of articles that are available and the articles available in each category. The system content tool 76 preferably indicates which system content items have already been used in previous emails.

The email editor further provides a user content tool 102. The user content tool 102 preferably presents a graphical user interface that enables the user to view lists of available user content within each defined user content type, to select the available user content for inclusion in the message, and to create additional user content. The available user content includes user content that has been previously entered using the user content editor tool 78 of the user content manager. Additional user content may be created by invoking the user content editor 78. In the newsletter example, the system includes user content of the types "event" and "promotion" and the user content tool enables the user to select event and promotion items for inclusion in the newsletter.

The email editor further provides a layout editor tool 104. The layout editor 104 preferably presents the user with a graphical user interface that enables the user to view a representation of all selected content and to manipulate the layout of the content. In the preferred embodiment of FIG. 3, a single column layout is used, and the layout editor displays a list of each selected system content item and user content item in the order in which they will appear, and enables the user to arrange the order of the items within the list. In alternative embodiments, the layout editor may provide predefined layout templates that allow the user to place each content item at a location within the template, and may allow the user to define additional layout templates. Other features such as fonts, colors, backgrounds and other display features may also be controlled through the layout editor. The layout editor preferably enables the user to invoke the email preview tool 58 of the email manager.

The email editor further includes a scheduling tool 106. The scheduling tool 106 preferably presents a graphical user interface that enables the user to select a date and time for message delivery.

In the preferred embodiment of the invention, the tools of the email editor are available to general and administrator level users. In alternative embodiments, different levels of access may be defined for the tools, or access to tools may be granted to a given user on a tool by tool basis.

Email Distributor

The email distributor of FIG. 3 prepares and sends individual email messages in accordance with emails configured and scheduled by the email manager 46, using email addresses obtained from the email list manager 54. The email distributor is typically implemented on or associated with an email server device, which may be the same as or distinct from the devices on which the remainder of the system is implemented.

Accounting Manager

The accounting manager of FIG. 3 provides accounting functions relating to users, communication program participants, and email recipients. For example, in the newsletter example, the accounting manager may track use of and payment for system resources by program participants, and may track use of and payment for third party ads by third party advertisers. The accounting manager may further assign credits against payments due from participants based on their inclusion of third party ads in their newsletters.

System Administration Manager

Figure 9:
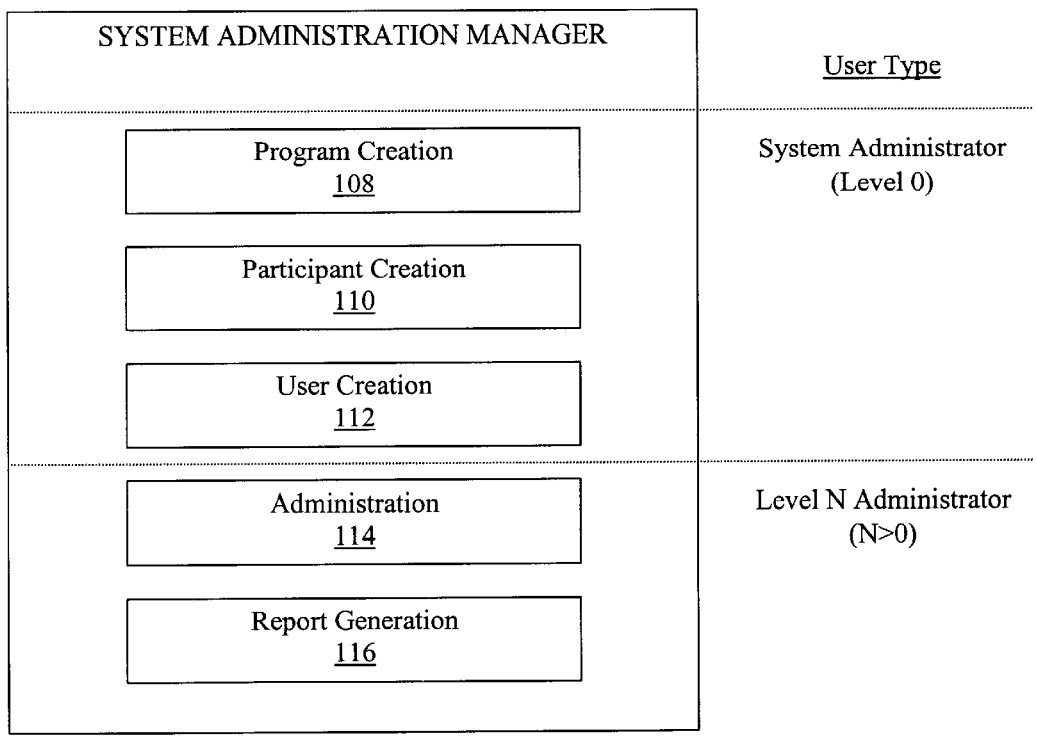
FIG. 9 illustrates tools provided by a system administration manager of the system of FIG. 3.

FIG. 9 illustrates tools provided by the system administration manager 60 of the preferred embodiment illustrated in FIG. 3. The system administration manager 60 provides tools including a program creation tool 108, a participant creation tool 110, a user creation tool 112, an administration tool 114, and a report generation tool 116.

The program creation tool 108 of the system administration manager enables a user to define a communication program that will be serviced by the system. The program creation tool 108 preferably presents a graphical user interface that enables the user to provide a name of a communication program and a description of the program.

The participant creation tool 110 of the system administration manager enables a user to create a communication program participant. The participant creation tool 110 preferably presents a graphical user interface that enables the user to specify the communication program of the participant, the level of the participant, the name of the participant, the affiliation of the participant with higher level participants, and other participant information. In the preferred embodiment of the invention, tools sets are associated with participants by default. However, in alternative embodiments, the participant creation tool may enable the user to specify the set of tools available to a participant at the time of its creation or to later edit the set of available tools.

The user creation tool 112 of the system administration manager enables a user to create a user within a communication program. The user creation tool 112 preferably presents a graphical user interface that enables the user to specify the program or programs of the user, the participant or participants with whom the user is affiliated, the level of access that the user will have to the system content manager, the email list manager, the email manager and the system administration manager, personal information for the user, and a user id and password. In the preferred embodiment, a user is assigned an access level at the time of its creation, and that access level determines which tools may be used by the user based on the access levels required for each tool as discussed above. However, in alternative embodiments, the user creation tool 122 may enable the user to assign levels of access on a component by component basis. In further alternative embodiments, access to tools may be granted to a granted to a user on a tool by tool basis The administration tool 114 of the system administration manager enables a user to perform various system administration functions regarding individual users at its level and lower affiliated levels. The administration tool 114 preferably presents a graphical user interface that enables the user to specify a user and to edit the user's information, access levels, user id and password, and other user related parameters. The user interface preferably enables users to be searched individually using any user related information, and preferably also enables the user to view user lists organized by participant affiliation.

The report generation tool 116 of the system administration manager enables a user to generate various reports concerning system operation and usage, and message related reports such as delivery success, subscribe and unsubscribe rates, and click through rates. The administration tool 116 preferably presents a graphical user interface that enables the user to specify the type of report to be generated and to view the report. The user is preferably enabled to generate reports that are specific to the user's level, specific to a lower level affiliated participant, or that combine information for multiple affiliated participants. For example, in the auto manufacturer newsletter example, the report generation tool 116 may be used by the national level user to generate a report providing aggregate click through rates for that advertisement for emails sent by all program participants.

The availability of each of the system administration manager tools depends on the level of access granted to the user. In the preferred embodiment of FIG. 3, the use of the program creation tool 108, participant creation tool 110 and user creation tool 112 is reserved to system administrator level users, that is, users that are above the level of any particular communication program that the system is configured to service. Administrator level users within a given communication program have access to the administration tool 114 and report generation tool 116.

In alternative embodiments, the participant creation tool 110 and user creation tool 112 may be made available to administrator level users within communication programs such that those users are enabled to create lower level affiliated participants and to create users within the communication program. In such a configuration, for example, a user at the national level (level 1) may create a regional level participant (level 2) or a local level participant (level 3). A regional level participant may similarly create a local level participant. In such embodiments, a participant created at a next lower level relative to its creator will be treated by the system as being affiliated with that creator, whereas an affiliation must be specified for participants created at levels lower than the next lowest level to the creator. Similarly, a user at the national level is enabled to create other users at the national level, regional level, or local level, and a regional level user is enabled to create other regional level users for his particular regional participant and local level users for affiliated local participants.

In further alternative embodiments, access to the system administration management tools may be provided to individual users on a tool by tool basis.

Hierarchical Authority among Communication Program Participants in the Use of System Tools Embodiments of the invention may be configured to service a hierarchical communication program by creating program participants and participant affiliations that correspond to those of the actual communication program. The participants may be provided with access to system tools and relative levels of authority in the use of system tools in accordance with of the needs of the particular communication program.

In the preferred embodiment of the invention, authority among participants is implemented in three different manners. In a first manner, the use of a tool is provided exclusively to one participant or exclusively to participants at a given level. For example, use of the system content manager tools may be reserved exclusively to the top level participant. Accordingly, only the top level participant may determine the system content items that will be available to participants within the program. In the preferred embodiment of the invention, the tools that are accessible to a given participant are established by default based on the level of that participant. However, in alternative embodiments, the tools available to a given participant may be configurable, for example by selection as part of the participant creation process.

A second manner of implementing authority involves tools that enable a participant to explicitly specify that its use of that tool overrides alternative uses of the same tool and related tools by lower level participants. For example, in the preferred embodiment of FIG. 3, the user content editor tool enables a participant to specify that user content created by that participant is mandatory for lower level affiliated participants. Thus, those lower level participants are not enabled to alter that user content or to create an email message that does not include that user content. Similarly, the participant affiliation tool of the email manager enables a user to specify that an email being created is to be distributed on behalf of a lower level affiliated user. Thus the lower level affiliated user is not permitted to alter any of the content specified by the participant who created the email. For this manner of implementing authority among participants, the system is configured such that relationships are defined among the tools of each participant's set of tools to indicate which uses of which tools may, at the option of the participant, override contrary uses of that tool or other tools by lower level participants. Thus, in accordance with this manner of implementing hierarchical authority, the tool itself enables the user to specify that its use of that tool controls the use of related tools by system users affiliated with lower affiliated participants. While explicit authority features are only implemented in some tools of the preferred embodiment, in alternative embodiments such features may be provided for other tools in accordance with the needs of the particular communication program.

A third manner of implementing authority involves providing tools that implicitly override contrary uses of the same tool and related tools by lower level users affiliated with lower level participants. For example, in the preferred embodiment of FIG. 3, the top level participant is enabled to use the header/footer tool of the email manager, and lower affiliated participants are unable to alter the headers and footers created by the national participant. Thus, for this manner of implementing authority among participants, the system is configured such that relationships are defined among the tools of each participant's set of tools to indicate which uses of which tools automatically override contrary uses of that tool or other tools by lower level participants. While implicit authority features are only implemented for some tools of the preferred embodiment, in alternative embodiments such features may be provided for other tools in accordance with the needs of the particular communication program.

Accordingly, a participant may exercise authority over the email message creation activities of other participants within a communication program in a variety of manners that may be configured in accordance with the needs of the particular marketing program. In the preferred embodiment of FIG. 3, the top level participant, for example a national level participant, is enabled to place text into message headers and footers that may not be altered by lower level participants. The top level participant also has access to user content management tools and may create user content and designate it as mandatory or optional for use by lower level participants. A middle level participant, for example a regional level participant, likewise has access to user content management tools and may create further user content and designate it as mandatory or optional for use by lower level participants. Thus in the preferred embodiment, the top level participant exercises authority over the local level participant in regard to the user content and headers and footers included in the bottom level participant's email messages. The middle level participant also exercises authority over the bottom level participant's in regard to user content.

While the aforementioned preferred embodiment represents one system configuration implemented to service a given type of marketing program structure, a wide variety of alternative configurations in accordance with the invention may be implemented using the various manners of authority implementation as discussed above. For example, in one alternative embodiment, the top level participant may be enabled to mandate system content for use by lower level participants, such as through features of system content management tools that allow such mandates to be explicitly specified, or by editing a message created by a lower level participant so as to incorporate that content. In further alternative embodiments, the use of any of the tools described above or other tools may be configured in accordance with a participant hierarchy.

Further embodiments of the invention may also be configured to serve a variety of different communication programs. For example, the system may be configured to serve a hierarchy of participants in a corporate internal communications program that sends email messages to employees, with top level management comprising the top level participant and various corporate communications departments in various sections of the corporation comprising lower level participants.

Thus a variety of embodiments of the invention may be provided in accordance with the needs of the particular communication program for which the embodiment is implemented. In accordance with one embodiment, a system may include a system content database storing system content items of predefined types such as those discussed above, and a user content database storing user content items of predefined types such as those discussed above. The system may further include a plurality of system tools for creating an electronic mail message from system content and user content.

In accordance with a further embodiment, a system may include a system content manager such as described above that is accessible to third party system content suppliers. Thus third party content suppliers are enabled to supply original content such as articles and advertisements that may then be used by the communication program participants in email messages. The system may further include a user content manager such as described above, an email manager such as described above, and an email list manager such as described above.

In accordance with a further embodiment, a system may comprise at least one processor and computer readable storage media coupled to the at least one processor. The computer readable storage media may store programming instructions that cause the system to provide tools for creating electronic mail messages, creating an electronic mail message in accordance with input provided by system users, and distributing the electronic newsletter on behalf of a participant. The system may be configured so that respective sets of said tools are accessible to respective participants. Therefore, an email message may be created based on input received from system users affiliated with different participants. Each system user may have access to a set of the tools based on the user's participant affiliation.

In accordance with a further embodiment, an electronic mail communication system may be implemented by providing a plurality of tools for creating an electronic mail message. A hierarchy of participants within a communication program to be serviced by the system may then defined. The system may further be configured to make respective sets of the tools accessible to the users affiliated with each participant. Relationships among related tools may also be defined. The relationships allow the use of a given tool on behalf of a given participant to control the uses of tools related to that tool by lower affiliated participants. This implements hierarchical authority among the participants in the creation of messages.

While the preferred embodiment illustrated in FIG. 3 includes a combination of features, those features may characterize further embodiments of the invention individually or in other combinations, and thus it will be apparent to those having ordinary skill in the art that the system features and processing tasks described herein are not necessarily exclusive of other features and processing tasks, nor required to exist in only those combinations particularly described, but rather that further alternative combinations may be implemented and that additional features and tasks may be incorporated in accordance with particular applications. Thus, while the embodiments illustrated in the figures and described herein are presently preferred, it should be understood that these embodiments are offered by way of example only. The invention is not limited to a particular embodiment, but extends to various modifications, combinations, and permutations that fall within the scope and spirit of the appended claims.

What is claimed is:

1. A method in a system for providing electronic mail communication on behalf of a participant within a communication program comprising a plurality of communication program participants, the method comprising:

providing system tools for creating electronic mail messages;

creating an electronic message in accordance with input provided by a plurality of system users using said system tools; and distributing the message on behalf of said participant, wherein respective sets of said system tools are accessible to respective participants within said communication program, wherein said message is created on behalf of said participant in accordance with input received from multiple system users associated with respective participants using the respective sets of tools accessible to said respective participants, and wherein the content of the message is controlled by the communication program participants in accordance with a hierarchy of authority of the communication program participants.

2. The method claimed in claim 1, wherein there is a hierarchy of authority among said participants, and wherein relationships are defined among related system tools of the respective sets of tools, said relationships specifying at least one of system tools that automatically override contrary uses of the same tool by lower level affiliated participants, and system tools that override contrary uses of the same tool by lower level affiliated participants at the option of the user of the tool.

3. The method claimed in claim 1, wherein each of said system tools has an access level associated therewith, and wherein a system user has access to said system tools in accordance with an affiliation of the system user with one of said participants and further in accordance with an access level granted to the system user.

4. The method claimed in claim 1, wherein at least one of said plurality of system tools enables a system user affiliated with a given participant to specify that its use of that tool controls the use of related system tools by system users affiliated with lower affiliated participants within the hierarchy.

5. A method for implementing an electronic mail message system, comprising:

providing a plurality of system tools for creating an electronic message;

defining a hierarchy of participants within a communication program to be serviced by said system;

configuring said system to make respective sets of said system tools accessible to respective participants of the communication program; and defining relationships among related tools of the respective sets of tools, said relationships specifying at least one of system tools that automatically override contrary uses of the same tool by lower level affiliated participants, and system tools that override contrary uses of the same tool by lower level affiliated participants at the option of the user of the tool, and wherein the content of the message is controlled by the participants in accordance with a hierarchy of authority of the participants.

6. The method claimed in claim 5, further comprising creating a plurality of system users, each user being affiliated with one of said participants, each user having access to system tools in accordance with the user's participant affiliation and an access level to each of said system tools granted to said user.

7. A system providing tools for producing electronic mail messages to be distributed to email recipients on behalf of a participant within a communication program comprising a plurality of communication program participants, the system comprising:

a system content manager comprising tools for creating, editing and categorizing system content items to be stored on the system for use in messages, said system content manager tools being accessible by a third party content supplier that is not a participant in the communication program;

a user content manager comprising tools for creating user content items by said participants;

an email manager comprising tools for creating messages by selecting system content items and user content items to be included in a message; and an email list manager comprising tools for creating distribution lists for said messages, wherein the content of the message is controlled by the communication program participants in accordance with a hierarchy of authority of the communication program participants.

8. The system claimed in claim 7, wherein access to respective sets of said tools is provided to respective participants of said communication program.

9. The system claimed in claim 8, wherein there is a hierarchy of authority among said participants, and wherein relationships are defined among related tools of the respective sets of tools, said relationships specifying at least one of tools that automatically override contrary uses of the same tool by lower level affiliated participants, and tools that override contrary uses of the same tool by lower level affiliated participants at the option of the user of the tool.

10. The system claimed in claim 7, wherein each of said tools has an access level associated therewith, and wherein a system user has access to said tools in accordance with an affiliation of the system user with one of said participants and further in accordance with an access level granted to the system user.

11. A system for producing an electronic mail message to be distributed to email recipients on behalf of a participant within a communication program comprising a plurality of communication program participants, the system comprising:

at least one processor; and computer readable storage media coupled to the at least one processor and having stored therein programming instructions for performing data processing comprising:

providing system tools for creating electronic mail messages;

creating an electronic message in accordance with input provided by a plurality of system users using said system tools; and distributing the message on behalf of said participant, wherein respective sets of said system tools are accessible to respective participants within said communication program, wherein said message is created on behalf of said participant in accordance with input received from multiple system users associated with respective participants using the respective sets of tools accessible to said respective participants, and wherein the content of the message is controlled by the communication program participants in accordance with a hierarchy of authority of the communication program participants.

12. The system claimed in claim 11, wherein there is a hierarchy of authority among said participants, and wherein relationships are defined among related system tools of the respective sets of tools, said relationships specifying at least one of system tools that automatically override contrary uses of the same tool by lower level affiliated participants, and system tools that override contrary uses of the same tool by lower level affiliated participants at the option of the user of the tool.

13. The system claimed in claim 11, wherein each of said system tools has an access level associated therewith, and wherein a system user has access to said system tools in accordance with an affiliation of the system user with one of said participants and further in accordance with an access level granted to the system user.

14. The system claimed in claim 11, wherein at least one of said plurality of system tools enables a system user affiliated with a given participant to specify that its use of that tool controls the use of related system tools by system users affiliated with lower affiliated participants within the hierarchy.

15. The system claimed in claim 14, wherein said at least one tool comprises a participant affiliation tool for specifying a participant on whose behalf the message is to be distributed.

16. The system claimed in claim 11, wherein said plurality of system tools comprise a system content tool for selecting third party advertisements to be included in the message.

17. The system claimed in claim 11, wherein said plurality of system tools comprise a system content tool for selecting articles to be included in the message.

18. The system claimed in claim 11, wherein said plurality of system tools comprise a user content tool for selecting user content items to be included in the message.

19. The system claimed in claim 11, wherein said plurality of system tools comprise a user content editor tool for creating and editing user content items.

20. The system claimed in claim 11, wherein said plurality of system tools comprise a layout editor tool for specifying a layout of the message.

21. The system claimed in claim 11, wherein said plurality of system tools further comprise an approval tool for approving distribution of the message.

22. The system claimed in claim 11, wherein said plurality of system tools further comprise a scheduler tool for scheduling distribution of the message.

23. The system claimed in claim 11, wherein said plurality of system tools comprise a system content type editor tool for defining said predefined types of system content.

24. The system claimed in claim 11, wherein said plurality of system tools comprise a system content category editor tool for defining categories of system content.

25. The system claimed in claim 11, wherein said plurality of system tools comprise a system content approval tool for approving system content for use in messages.

26. The system claimed in claim 11, wherein said plurality of system tools comprise a user content type editor tool for defining said predefined types of user content items.

27. The system claimed in claim 11, wherein said plurality of system tools comprise an email address group definition editor tool for defining a message distribution list.

28. The system claimed in claim 11, wherein said plurality of system tools comprise an email address group membership editor tool for associating email addresses with message distribution lists.

29. The system claimed in claim 11, wherein said plurality of system tools comprise:
   a program creation tool for defining a communication program to be serviced by the system; and
   a participant creation tool for defining participants of said communication program.

30. The system claimed in claim 29, wherein defining a participant comprises defining a subset of tools accessible by system users affiliated with that participant.

31. The system claimed in claim 11, wherein said plurality of system tools comprise a user creation tool for creating a system user affiliated with one of said participants.

32. The system claimed in claim 31, wherein creating a system user comprises specifying an access level for that system user.

33. The system claimed in claim 31, wherein creating a system user comprises specifying system tools accessible to that system user.

34. The system claimed in claim 31, wherein creating a system user comprises specifying a participant affiliation of that system user.

35. The system claimed in claim 11, wherein said plurality of system tools comprise a report generation tool for generating reports comprising aggregate information relating to a given participant and lower affiliated participants.

36. The system claimed in claim 11, wherein said plurality of system tools comprise an accounting manager for tracking use of third party advertisements in messages.

37. The system claimed in claim 11, wherein said plurality of system tools comprise an email distributor for distributing said message to email recipients.

38. The system claimed in claim 37, wherein said email distributor cooperates with an email list manager for managing email group membership lists in accordance with invalid email addresses detected by the email distributor.

39. The system claimed in claim 11, wherein said communication program is a marketing program.

40. The system claimed in claim 11, wherein said electronic mail message is a newsletter.

41. The system claimed in claim 40, further comprising a web page module provided on a participant's web page to enable a web page user to subscribe to the newsletter.

42. A system for producing an electronic mail message to be distributed to email recipients on behalf of a participant within a communication program comprised of a hierarchy of participants, the system comprising:
   a system content database storing system content items of predefined types that are available for use in said message;
   a user content database storing user content items of predefined types created by said communication program participants for use in said message; and
   a plurality of system tools for creating said message, said message including system content items and user content items,
   wherein access to respective sets of said tools for creating said message is provided to respective participants of said communication program such that each participant may contribute to the creation of said message in the manners provided by its respective set of tools,
   wherein relationships are defined among related tools of the respective sets of said tools such that use of a given tool on behalf of a given participant may control uses of the given tool on behalf of lower affiliated participants within the hierarchy, and
   wherein the content of the message is controlled by the participants in accordance with a hierarchy of authority of the participants.

43. The system claimed in claim 42, wherein each of said plurality of system tools has an access level associated therewith, and
   wherein a system user has access to said system tools in accordance with an affiliation of the system user with one of said participants and further in accordance with an access level granted to the system user.

44. The system claimed in claim 42, wherein said defined relationships among system tools specify at least one of system tools that automatically override contrary uses of the same tool by lower level affiliated participants, and system tools that override contrary uses of the same tool by lower level affiliated participants at the option of the user of the tool.

45. The system claimed in claim 44, wherein said at least one of said system tools comprises a participant affiliation tool for specifying a participant on whose behalf the message is to be distributed.

46. The system claimed in claim 42, wherein said plurality of system tools comprise a system content tool for selecting third party advertisements to be included in the message.

47. The system claimed in claim 42, wherein said plurality of system tools comprise a system content tool for selecting articles to be included in the message.

48. The system claimed in claim 42, wherein said plurality of system tools comprise a user content tool for selecting user content items to be included in the message.

49. The system claimed in claim 42, wherein said plurality of system tools comprise a user content editor tool for creating and editing user content items.

50. The system claimed in claim 42, wherein said plurality of system tools comprise a layout editor tool for specifying a layout of the message.

51. The system claimed in claim 42, wherein said plurality of system tools further comprise an approval tool for approving distribution of the message.

52. The system claimed in claim 42, wherein said plurality of system tools further comprise a scheduler tool for scheduling distribution of the message.

53. The system claimed in claim 42, wherein said plurality of system tools comprise a system content type editor tool for defining said predefined types of system content.

54. The system claimed in claim 42, wherein said plurality of system tools comprise a system content category editor tool for defining categories of system content.

55. The system claimed in claim 42, wherein said plurality of system tools comprise a system content approval tool for approving system content for use in messages.

56. The system claimed in claim 42, wherein said plurality of system tools comprise a user content type editor tool for defining said predefined types of user content items.

57. The system claimed in claim 42, wherein said plurality of system tools comprise an email address group definition editor tool for defining a message distribution list.

58. The system claimed in claim 42, wherein said plurality of system tools comprise an email address group membership editor tool for associating email addresses with message distribution lists.

59. The system claimed in claim 42, wherein said plurality of system tools comprise:

a program creation tool for defining a communication program to be serviced by the system; and a participant creation tool for defining participants of said communication program.

60. The system claimed in claim 59, wherein defining a participant comprises defining a subset of system tools accessible by system users affiliated with that participant.

61. The system claimed in claim 42, wherein said plurality of system tools comprise a user creation tool for creating a system user affiliated with one of said participants.

62. The system claimed in claim 61, wherein creating a system user comprises specifying an access level for that system user.

63. The system claimed in claim 61, wherein creating a system user comprises specifying system tools accessible to that system user.

64. The system claimed in claim 61, wherein creating a system user comprises specifying a participant affiliation of that system user.

65. The system claimed in claim 42, wherein said plurality of system tools comprise a report generation tool for generating reports comprising aggregate information relating to a given participant and lower affiliated participants.

66. The system claimed in claim 42, wherein said plurality of system tools comprise an accounting manager for tracking use of third party advertisements in messages.

67. The system claimed in claim 42, wherein said plurality of system tools comprise an email distributor for distributing said message to email recipients.

68. The system claimed in claim 67, wherein said email distributor cooperates with an email list manager for managing email group membership lists in accordance with invalid email addresses detected by the email distributor.

69. The system claimed in claim 42, wherein said communication program is a marketing program.

70. The system claimed in claim 42, wherein said electronic mail message is a newsletter.

71. The system claimed in claim 70, further comprising a web page module provided on a participant's web page to enable a web page user to subscribe to the newsletter.

72. The system of claim 42, wherein participants with a higher level of authority in the hierarchy of authority are capable of mandating the content of the message to participants with a lower level of authority in the hierarchy of authority.

73. The system of claim 72, wherein participants with a higher level of authority in the hierarchy of authority are capable of mandating a type of content of the message to participants with a lower level of authority in the hierarchy of authority.

74. The system of claim 72, wherein participants with a higher level of authority in the hierarchy of authority are capable of mandating a specific piece of content of the message to participants with a lower level of authority in the hierarchy of authority.

75. The system of claim 72, wherein participants with a higher level of authority in the hierarchy of authority mandate a type of content of the message to participants with a lower level of authority in the hierarchy of authority.

76. The system of claim 72, wherein the plurality of system tools authorize participants with a higher level of authority in the hierarchy of authority to mandate a specific piece of content of the message to participants with a lower level of authority in the hierarchy of authority.

77. The system of claim 42, wherein participants with a lower level of authority in the hierarchy of authority cannot eliminate content in the message mandated by participants with a higher level of authority in the hierarchy of authority.

78. The system of claim 42, wherein the hierarchical control of the content of the message is implemented through exclusive rights to said tools.

79. The system of claim 78, wherein said tools used by participants lower in the hierarchy cannot override content selections by participants higher in the hierarchy.

80. The system of claim 42, wherein participants with a higher level of authority in the hierarchy of authority mandate the content of the message to participants with a lower level of authority in the hierarchy of authority.

81. The system of claim 42, wherein the plurality of system tools authorize participants with a higher level of authority in the hierarchy of authority to mandate the content of the message to participants with a lower level of authority in the hierarchy of authority.

82. The system of claim 42, wherein the plurality of system tools designate that participants with a lower level of authority in the hierarchy of authority cannot eliminate content in the message mandated by participants with a higher level of authority in the hierarchy of authority.

83. The system of claim 42, wherein the plurality of system tools authorize the hierarchical control of the content of the message.

* * * * *